(12) United States Patent
Mitsumori et al.

(10) Patent No.: US 8,475,902 B2
(45) Date of Patent: Jul. 2, 2013

(54) OPTICAL RECORDING MEDIUM

(75) Inventors: Ayumi Mitsumori, Yamanashi (JP);
Takuma Yanagisawa, Kawasaki (JP);
Takanobu Higuchi, Tokyo (JP)

(73) Assignee: Pioneer Corporation, Kanagawa (JP)

( * ) Notice: Subject to any disclaimer, the term of this patent is extended or adjusted under 35 U.S.C. 154(b) by 141 days.

(21) Appl. No.: 13/056,619

(22) PCT Filed: Jul. 30, 2008

(86) PCT No.: PCT/JP2008/063662
§ 371 (c)(1),
(2), (4) Date: Mar. 14, 2011

(87) PCT Pub. No.: WO2010/013321
PCT Pub. Date: Feb. 4, 2010

(65) Prior Publication Data
US 2011/0206889 A1    Aug. 25, 2011

(51) Int. Cl.
*G11B 7/24* (2006.01)
(52) U.S. Cl.
USPC .................... 428/64.1; 428/64.4; 430/270.11
(58) Field of Classification Search
USPC .................... 428/64.4; 430/270.11
See application file for complete search history.

(56) References Cited

U.S. PATENT DOCUMENTS

2006/0092821 A1    5/2006  Tsukagoshi et al.
2007/0014225 A1*   1/2007  Mishima et al. ........... 369/275.1

FOREIGN PATENT DOCUMENTS

| JP | 2001-155380 A | 6/2001 |
| JP | 2006-040456 A | 2/2006 |
| JP | 2006-059433 A | 3/2006 |
| JP | 2006-127636 A | 5/2006 |
| JP | 2006-252752 A | 9/2006 |
| JP | 2008-159203 A | 7/2008 |
| WO | 2008078407 A1 | 7/2008 |

OTHER PUBLICATIONS

Chinese Patent Office Action dated Feb. 23, 2012 and English-language translation thereof.

* cited by examiner

*Primary Examiner* — Elizabeth Mulvaney
(74) *Attorney, Agent, or Firm* — Sughrue Mion, PLLC

(57) ABSTRACT

A multilayer optical recording medium in which, as a recording layer is located farther from a surface of incidence of a light beam for reading, the amount of light that reaches the surface of incidence after being reflected off the recording layer is smaller.

9 Claims, 10 Drawing Sheets

OPTICAL RECORDING MEDIUM

TECHNICAL FIELD

The present invention relates to an optical recording medium such as an optical disk with a large number of stacked recording layers.

BACKGROUND ART

In a multilayer optical disk with a large number of stacked recording layers, the reflectance of each recording layer is generally designed such that the amounts of light reflected back from the respective recording layers are the same on a surface of incidence of a light beam. Meanwhile, the multilayer optical disk suffers from multiple reflection. With reference, for example, to a multilayer optical disk with eight stacked recording layers L0 to L7 shown in FIG. 1, for playback of the recording layer L0 as a target layer located farthest from a surface of incidence of a light beam of the optical disk, the light beam is focused on the recording layer L0, and is reflected off the recording layer L0. At the same time, the light beam is also reflected off the recording layers L1, L2, and L3 near the recording layer L0. The light reflected off the recording layers L1, L2, and L3 forms first, second, and third confocal spots on the back surfaces of the recording layers L2, L4, and L6, respectively. These spots generate interlayer crosstalk, which is hereinafter called multiple reflection CT.

There is a known conventional technique of reducing multiple reflection CT (see Patent Literatures 1 to 4), in which every distance between multiple recording layers of an optical disk is defined such that at least some of distances between the adjacent recording layers differ from each other.
[Patent Literature 1] Japanese Patent Kokai No. 2001-155380
[Patent Literature 2] Japanese Patent Kokai No. 2006-40456
[Patent Literature 3] Japanese Patent Kokai No. 2006-59433
[Patent Literature 4] Japanese Patent Kokai No. 2006-252752

DISCLOSURE OF THE INVENTION

Problem to be Solved by the Invention

Even the simplest technique requires two types of interlayer distances. This leads to complication of a manufacturing method of a disk, thereby reducing yield and increasing manufacturing cost. The complication is described in detail next.

A technique of using film sheets, and a spin coat technique are generally employed to form intermediate layers of a multilayer disk. The technique of using sheets realizes reduction in error of an interlayer distance (shift from an established interlayer distance). Meanwhile, this technique requires sheets of several types in order to define multiple interlayer distances, and a sheet type should be changed for each recording layer, thereby reducing yield. In the spin coat technique, an interlayer distance can be changed by adjusting parameters such as the amount of resin to be dropped and the number of revolutions of a spindle. However, these parameters are generally adjusted very severely. Accordingly, in many cases, even slight change in a surrounding environment such as temperature and humidity generates a large error of an interlayer distance. The parameters should be suitably be adjusted to reduce an error of an interlayer distance. Further, the parameters should be adjusted several times if interlayer distances of several types are to be defined. This leads to complication of a manufacturing method of a disk that leads to reduction in yield, thereby resulting in increase of manufacturing cost as described above.

If the foregoing multilayer disk has nonuniform interlayer distances, a drive for recording and playback of this disk should change the amount of movement of an objective lens, the amount of correction of spherical aberration and the like for each recording layer when a jump is to be made between layers, resulting in a complicated control logic.

The aforementioned problem is an example of a problem to be solved by the invention. The invention is intended to provide an optical recording medium with a large number of recording layers the structure of which is simpler than a conventional structure, and which is capable of reducing multiple reflection.

Means for Solving the Problem

An optical recording medium of the invention according to claim 1 is a multilayer optical recording medium with at least three stacked recording layers. In this optical recording medium, as a recording layer is located farther from a surface of incidence of a light beam for reading, the amount of reflected light that reaches the surface of incidence after being reflected off the recording layer is smaller.

BEST MODE(S) FOR CARRYING OUT THE INVENTION

In the optical recording medium of the invention according to claim 1, the amount of light reflected back from a recording layer is smaller as the recording layer is located farther from the surface of incidence. This realizes reduction in multiple reflection CT during playback of a layer located farther from the surface. Accordingly, a jitter value of the layer located farther from the surface is improved.

Embodiments

An example of the present invention will be described in detail with reference to the drawings.

FIG. 2 is a diagram showing the cross-sectional structure of an optical disk according to the present invention. The optical disk is a 20-layer disk, and includes a substrate 1, recording layers L0 to L19 each composed of a reflective film on which a pit sequence is formed, and intermediate layers 2 between the recording layers. The recording layers L0 to L19 are arranged in this order as viewed from the substrate 1. The intermediate layers 2 made of an ultraviolet curable resin are placed between the recording layers L0 to L19. The recording layer (nearest layer) L19 is placed through the intermediate layer 2 at a position nearest a disk surface on which a laser beam impinges. The recording layers L0 to L19 are made of a dielectric such as $Nb_2O_5$ and $TiO_2$.

As shown in FIG. 3, the amounts of light reflected back from the recording layers L0 to L19 to the surface of incidence of beam light of the disk decreases in the order from the recording layer L19 to the recording layer L0.

The reflectance of each of the recording layers L0 to L19 is determined to satisfy the following. As an example, the amounts of light reflected back from the recording layers L19, L18, and L17 are 1.20%, 1.17%, and 1.14% of the amount of the light entered the disk, respectively. That is, the amount of reflected light is changed in decrements of about 0.03% (=0.6/19) for each recording layer. Further, the amount of light reflected back from the recording layer L0 is half the amount of light reflected back from the recording layer L19, namely is 0.06%.

The respective reflectances of the recording layers L19 to L0 are set to 1.36%, 1.42%, ... and 3.71% so that the amount of reflected light that reaches a surface of incidence of a light beam after being reflected off a recording layer is smaller as the recording layer is located farther from the surface of incidence of a light beam.

The reflectance of the surface of incidence of the disk is 4.0%, the absorption factor of each intermediate layer is 2.2%, and interlayer distances are uniformly 10 μm.

As shown in FIG. 4, the relationship between the thickness of the dielectric reflective films (in the case of $Nb_2O_5$) forming the recording layers L0 to L19 and a reflectance has such characteristics that a reflectance increases with a greater film thickness if the film thickness is equal to or smaller than 40 nm. It is assumed, for example, that the refractive indexes of $Nb_2O_5$ and an ultraviolet curable resin used for forming the intermediate layers 2 are 2.5 and 1.6, respectively. In this case, the thicknesses of the recording layers L19 and L0 are about 7 nm and 12 nm, respectively. The wavelength of a light beam is set at 405 nm in FIG. 4. Accordingly, the respective thicknesses of the recording layers L0 to L19 decrease in the order from the recording layer L0 to the recording layer L19, so that the amounts of light reflected back to the surface of incidence of the disk decrease in the order from the recording layer L19 to the recording layer L0 as shown in FIG. 3.

The aforementioned optical disk of the present invention is formed on a chemically strengthened substrate 11 (of an exemplary outer diameter ϕ 120 mm and an exemplary inner diameter ϕ 15 mm) by using an ultraviolet curable resin 12. The thickness of the ultraviolet curable resin 12 becomes an intermediate layer (represented by the aforementioned numeral 2) that defines a distance between recording layers. Pits are transferred to a surface of the ultraviolet curable resin 12, so that the ultraviolet curable resin 12 becomes a signal transfer layer. A dielectric ($Nb_2O_5$) 13 is deposited on a surface of the signal transfer layer by sputtering, thereby forming a recording layer. The amount of light reflected back from each recording layer is determined for each recording layer by changing the thickness of each recording layer under a separately defined condition.

More specifically, an intermediate layer made of the ultraviolet curable resin 12 is formed by the spin technique concurrently signal transfer. As shown in FIG. 5(a), an appropriate amount of the ultraviolet curable resin 12 is dropped onto the substrate, and then a stamper 14 on which pits are formed is placed thereon. The substrate 11 in this state is caused to rotate at high speed to blow off excess portion of the ultraviolet curable resin 12. As a result, an ultraviolet curable resin layer 12 is formed that has a thickness determined by the number of rotations and a duration of rotation. Next, ultraviolet rays are applied to cure the ultraviolet curable resin 12 as shown in FIG. 5(b). The stamper 14 is removed after the curing, and the dielectric 13 is deposited to form a reflective film, thereby forming one recording layer as shown in FIG. 5(c). The ultraviolet curable resin 12 is further dropped onto the recording, and then the aforementioned steps are repeated. A cover layer (not shown) is formed in a final step, thereby forming multilayer disk. Ultraviolet rays for curing an ultraviolet curable resin may be applied onto either the substrate 11 or the stamper 14. If ultraviolet rays are to be applied to the stamper 14, the stamper 14 should be made of a material that allows an ultraviolet ray to pass therethrough. If ultraviolet rays are to be applied to the substrate 11, the penetrating power of an ultraviolet ray decreases with an increasing number of recording layers. Accordingly, in this case, the intensity of an ultraviolet ray, and the accumulated amount of light should be increased.

A disk drive device intended for playback of the optical disk of the present invention includes a playback optical system, and a signal processing system.

As shown in FIG. 6, the playback optical system includes a light source 21, a collimator lens 22, a beam splitter 23, an expander lens 24, an objective lens 25, a condenser lens 26, and a detector 27. The signal processing system includes a laser driving circuit 30, a signal processing circuit 31, a controller 32, an objective lens driving circuit 33, a spherical aberration correcting element driving circuit 34, and a memory 35. The optical disk mentioned above is represented by numeral 20 in FIG. 6.

The light source 21 is a semiconductor laser element for emitting laser beams. The collimator lens 22 converts laser beams emitted from the light source 21 to parallel beams, and supplies the parallel beams to the beam splitter 23. The beam splitter 23 transfers the parallel laser beams supplied from the collimator lens 22 to the expander lens 24 as they are. The expander lens 24 is a spherical aberration correcting element, and has first and second correction lenses 24a and 24b. The correction lenses 24a and 24b are driven by actuators 24c and 24d, respectively, and are movable in the direction of an optical axis. Spherical aberration correction of each recording layer of the optical disk 20 is realized by adjusting a distance between the first and second correction lenses 24a and 24b. Laser beams corrected for spherical aberration by the expander lens 24 are supplied to the objective lens 25. The objective lens 25 causes the parallel laser beams to converge. The objective lens 25 has an actuator 25a with a focusing part for causing the objective lens 25 to move in the direction of the optical axis, and a tracking part for causing the objective lens 25 to move in the direction of a disk radius that is perpendicular to the optical axis. The focusing part focuses a laser beam onto one of the recording layers of the optical disk 20. The tracking part places the light spot of the laser beam on the track of the one recording layer.

The laser beam reflected off any one of the recording layers of the optical disk 20 returns as parallel laser beams to the beam splitter 23 through the objective lens 25 and the expander lens 24. Then, the beam splitter 23 causes reflection of the reflected laser beams at an angle of about 90 degrees with respect to the incidence, and supplies the reflected laser beams to the condenser lens 26. The condenser lens 26 condenses the reflected laser beams on the light receiving surface of the detector 27 to form a spot on the light receiving surface. The detector 27 has a light receiving surface with four quadrants, for example, and generates a voltage signal for each quadrant the level of which is responsive to the intensity of received light.

The laser driving circuit 30 of the signal processing system drives the light source 21 in response to instructions by the controller 32. The signal processing circuit 31 generates an RF signal that is a read signal from recorded information in response to an output voltage signal of the detector 27. The signal processing circuit 31 also generates servo signals such as a focus error signal and a tracking error signal. A focus error signal may be generated, for example, by a publicly known signal generating method such as an astigmatic method. A tracking error signal may be generated, for example, by a publicly known signal generating method such as a push-pull method.

The controller 32 receives servo signals from the signal processing circuit 31. Then, the controller 32 supplies a tracking control signal and a focusing control signal to the objective lens driving circuit 33 in order to realize tracking control and focusing control by the objective lens 25. The controller 32 supplies a spherical aberration correction control signal to the spherical aberration correcting element driving circuit 34 in order to realize spherical aberration correction control by the expander lens 24. A spherical aberration correction control signal to be generated is such that it indicates a spherical aberration correction value optimum for a recording layer on which focusing is to be realized. More specifically, a spherical aberration correction value optimum for each recording layer is stored as a data table in the memory 35. A spherical aberration correction value corresponding to a recording layer on which focusing is to be realized is extracted from the data table, and then a spherical aberration correction control signal indicative of the extracted spherical aberration correction value is generated. Generally, a tracking control signal is generated such that it makes the level of a tracking error signal zero, and a focusing control signal is generated such that it makes the level of a focus error signal zero. The memory 35 stores an operating program of the controller 32 and a data table.

The objective lens driving circuit 33 drives the tracking part of the actuator 25a in response to a tracking control signal to cause the objective lens 25 to move in the direction of the disk radius that is perpendicular to the optical axis. The objective lens driving circuit 33 drives the focusing part of the actuator 25a in response to a focusing control signal to cause the objective lens 25 to move in the direction of the optical axis. The spherical aberration correcting element driving circuit 34 drives the actuators 24c and 25d in response to a spherical aberration correction control signal to cause the first and second correction lenses 24a and 24b to move in the direction of the optical axis.

An RF signal is demodulated at a demodulation processing circuit not shown to become an audio signal and an image signal.

A description will be given of the reason why multiple reflection is reduced by determining the amount of light reflected back to the surface of incidence of the optical disk to be smaller as a recording layer is located farther from the surface of incidence. In the following, like in the case of FIG. 1, the number of recording layers of the optical disk is eight, namely the optical disk has recording layers L0 to L7.

FIG. 7 is a diagram illustrating the amount of light reflected back after entering the multilayer optical disk and after being reflected off each of recording layers $L_{N-1}$ and $L_{N-2}$. In FIG. 7, Ri is the amount of light reflected back from an i layer, $r_i$ is the reflectance of the i layer, $t_i$ is the transmittance of the i layer, $r_{su}$ is a surface reflectance, $t_{su}$ is a surface transmittance ($r_{su}+t_{su}=1$), $t_{sp}$ is the transmittance of each intermediate layer, and N is the number of recording layers.

The amount of light reflected back from the recording layer $L_{N-1}$ (layer nearest the surface of incidence) is considered first. For simplicity, the amount of light that enters the disk is set at 1.0. The amount of light passing through the surface of incidence of the disk is $t_{su}$, and the transmittance of each intermediate layer is $t_{sp}$. Accordingly, the amount of the light that reaches the recording layer $L_{N-1}$ is expressed as $t_{su}t_{sp}$. The reflectance of the recording layer $L_{N-1}$ is $r_{N-1}$. Accordingly, the amount of light in a state immediately after the light is reflected off the recording layer $L_{N-1}$ is $t_{su}t_{sp}r_{N-1}$. The amount of this light that again passed through an intermediate layer is $t_{su}t_{sp}^2 r_{N-1}$. The amount of the light $R_{N-1}$ that finally returns from the disk after passing through the disk surface is expressed as $R_{N-1}=t_{su}^2 t_{sp}^2 r_{N-1}$. Likewise, the amount of light reflected back from the recording layer $L_{N-2}$ is expressed as $R_{N-2}=t_{su}^2 t_{sp}^4 t_{N-1}^2 r_{N-1}$. The amount of light reflected back from the recording layer Li (i=zero to N−1) is generally expressed as follows:

$$Ri = T_i^2 \times r_i = t_{su}^2 t_{sp}^{2(N-i)}\left(\prod_{j=i+1}^{N-1} t_j^2\right)$$ [Formula 1]

Herein, $$Ti = t_{su}t_{sp}^{N-i}\left(\prod_{j=i+1}^{N-1} t_j\right)$$ [Formula 2]

indicates the amount of light that reaches the recording layer Li.

The conventional multilayer optical disk is designed such that the amounts of light reflected back from all recording layers are the same. More specifically, the optical disk is designed so that $$R_0=R_1=\ldots R_{N-1}=R_{ref}$$ [Formula 3]

is satisfied.

The reflectance $r_i$ of each recording layer is obtained as follows from Formulas 1 and 3:

$$r_i = \frac{R_{ref}}{T_i^2} = \frac{R_{ref}}{t_{su}^2 t_{sp}^{2(N-i)}\left(\prod_{j=i+1}^{N-1} t_j^2\right)}$$

The reflectances of the respective layers of the eight-layer disk are shown in FIG. 8 that are calculated under conditions that $r_{su}=4\%$ ($t_{su}=96\%$), $t_{sp}=97.8\%$, and $R_{ref}=5\%$.

As seen from FIG. 8, by making the amounts of light $R_i$ reflected back from all the recording layers to be the same, the reflectance $r_i$ of a recording layer becomes greater as the recording layer is located farther from the surface of incidence. Thus, the following formula is established in the conventional multilayer optical disk:

$$r_0>r_1>\ldots r_{N-2}>r_{N-1}$$ [Formula 5]

A path of a light beam reflected back from each recording layer at the time of playback of the recording layer L0 is shown in FIG. 9(a). The amounts of light $R_0$, $R_1$, and $R_2$ reflected back from the recording layers $L_0$, $L_1$, and $L_2$ after being reflected once off the recording layers $L_0$, $L_1$, and $L_2$, respectively, are expressed as follows:

$$R_0=T_2^2 t_{sp}^4 t_2^2 t_1^2 r_0$$

$$R_1=T_2^2 t_{sp}^2 t_2^2 r_1$$

$$R_2=T_2^2 r_2$$ [Formula 6]

The amount of light $R_0^{1st}$ reflected back after being reflected several times to form a first confocal spot is expressed as follows:

$$R_0^{1st}=T_2^2 t_{sp}^4 t_2^2 r_1^2 r_2$$ [Formula 7]

A degree of effect of multiple reflection CT during playback of the recording layer L0 is expressed as follows by using a ratio between $R_0$ and $R_0^{1st}$:

$$\frac{R_0^{1st}}{R_0} = \frac{r_1^2 r_2}{t_1^2 r_0} = t_{sp}^2\left(\frac{R_1}{R_0}\right)r_1 r_2$$ [Formula 8]

A degree of effect of multiple reflection CT during playback of the recording layer L1 is determined in exactly the same manner, and is expressed as follows by using a ratio between $R_1$ and $R_1^{1st}$:

$$\frac{R_1^{1st}}{R_1} = \frac{r_2^2 r_3}{t_2^2 r_1} = t_{sp}^2 \left(\frac{R_2}{R_1}\right) r_2 r_3 \quad \text{[Formula 9]}$$

Accordingly, a degree of effect of multiple reflection CT during playback of the recording layer Li is expressed as follows by using a ratio between $R_i$ and $R_i^{1st}$:

$$\frac{R_i^{1st}}{R_i} = t_{sp}^2 \left(\frac{R_{i+1}}{R_i}\right) r_{i+1} r_{i+2} \quad \text{[Formula 10]}$$

The following formula is established from Formulas 3, 5 and 10 given above:

$$\frac{R_0^{1st}}{R_0} > \frac{R_1^{1st}}{R_1} > \ldots > \frac{R_{N-3}^{1st}}{R_{N-3}} \quad \text{[Formula 11]}$$

In the conventional multilayer disk, the effect of multilayer reflection CT is greater as a layer is located farther from the surface. The reason why Formula 11 ends with N−3 is that a confocal spot caused by multiple reflection is not generated in the nearest recording layer $L_{N-1}$ and the recording layer $L_{N-2}$ next to the recording layer $L_{N-1}$.

It is seen from Formula 10 that a degree of effect of multiple reflection CT is reduced by reducing the reflectances $r_{i+1}$ and $r_{i+2}$ of the recording layers. It is also seen from Formula 4 that $r_{i+1}$ and $r_{i+2}$ are reduced by reducing $R_{ref}$. That is, a degree of effect of multiple reflection CT becomes smaller by reducing the amount of light reflected back after being reflected once off a recording layer. However, reducing $R_{ref}$ means lowering a signal level. Accordingly, a signal S/N degrades if $R_{ref}$ is excessively reduced.

A signal S/N in optical disk systems includes two types: electric S/N and optical S/N. The former is a ratio between an electrical signal Se formed as a result of photoelectric conversion of signal light from a recording layer at a detector (photodetector) and an electrical noise Ne generated in an electrical circuit system (Ne is constant as it is determined by a circuit system), and is expressed as Se/Ne. The latter is a ratio between the intensity So of signal light reflected back from a recording surface and the intensity No of stray light reflected off a surface other than a recording surface, and is expressed as So/No.

The electrical signal Se is proportionate to the signal light intensity So. The signal light intensity So is determined by a product of the amount of light $R_{ref}$ reflected once and the amount of incident light. Accordingly, if $R_{ref}$ is reduced to reduce the effect of multiple reflection CT, the amount of incident light may be increased to compensate for the reduction of $R_{ref}$, and a product of $R_{ref}$ and the amount of incident light may be stored. Thus, degradation of Se/Ne is avoided.

The intensity No of stray light reflected off a surface other than a recording surface is proportionate to the amount of incident light. Accordingly, reducing $R_{ref}$ to reduce the effect of multiple reflection CT, and increasing the amount of incident light to compensate for the reduction of $R_{ref}$ result in degradation of So/No.

Stray light reflected off a surface other than a recording surface may include interface reflected light generated on a disk surface, and stray light reflected off an optical member such as an objective lens. However, the stray light intensity No is hardly influenced as an antireflection film to prevent stray light reflection is provided to generally employed optical members, or an optical axis is slightly tilted to prevent reflection from reaching a detector. Accordingly, the most significant No component in an optical disk system is surface reflecting light on a disk.

DVDs and BDs as optical disks have one or two recording layers and do not have a confocal spot accordingly, so that these optical disks do not suffer from multiple reflection CT. Accordingly, $R_{ref}$ has been designed to have a value close to its maximum possible value. Thus, the intensity No of light reflected from the disk surface is sufficiently small relative to the intensity So of light reflected from a recording layer, and does not cause any adverse effect. However, in the case of a multilayer disk with three or more layers, surface reflecting light on the disk becomes nonnegligible as a possible value of $R_{ref}$ significantly decreases, and reflectance may be reduced further to suppress multiple reflection CT.

As described above, it is hard to reduce multiple reflection CT by reducing $R_{ref}$ if the stray right intensity No is nonnegligible. Accordingly, the conventional techniques disclosed in Patent Literatures 1 to 4 listed above try to prevent generation of a confocal spot by controlling an interlayer distance.

However, as already described in "Problem to be Solved by the Invention", strictly controlling an interlayer distance results in various disadvantages in manufacture of disks. The invention has been made in light of this, and is intended to reduce the effect of multiple reflection CT while causing no reduction in S/N without strictly controlling an interlayer distance.

FIG. 10 is a graph showing the amount of surface reflecting light that enters a detector with a horizontal axis indicating a focus position (distance from a disk surface). In this graph, surface reflectance is 4%, and the size of a standardized detector (determined by dividing a detector area by the square of a magnification ratio) is 44 [$\mu m^2$].

It is seen from FIG. 10 that the surface reflecting light entering the detector significantly decreases as a focus position gets farther from the disk surface. That is, while being nonnegligible during playback of a recording layer near the surface of incidence of the disk, the stray light intensity No is sufficiently small during playback of a recording layer located farther from the surface of incidence. This means that, while $R_{ref}$ cannot be reduced much to reduce the effect of multiple reflection CT in the case of a recording layer near the surface of incidence, $R_{ref}$ can be reduced sufficiently to reduce the effect of multiple reflection CT in the case of a recording layer located farther from the surface of incidence.

Accordingly, as shown in FIG. 3, the structure of the multilayer optical disk of the present invention is configured such that the amount of reflected light $R_i$ gradually decreases in the order from a recording layer near the surface of incidence of the optical disk to a recording layer located farther from the surface of incidence.

A description by using Formulas will be given of how multiple reflection CT can be reduced by the multilayer optical disk of the present invention. For simplicity, the following description refers to the effect of multiple reflection CT generated by a first confocal spot during playback of the recording layer L0 of the optical disk with 8 recording layers farthest from the surface of incidence.

Formula 8 given above indicating a degree of effect of multiple reflection CT during playback of the recording layer L0 may be modified as follows:

$$\frac{R_0^{1st}}{R_0} = t_{sp}^2 \left(\frac{R_1}{R_0}\right) r_r r_2 = \left(\frac{R_2}{R_0}\right)\left(\frac{R_1}{T_2^2 t_2}\right)^2 \quad \text{[Formula 12]}$$

Relationship $r_i + t_i = 1$ is established if absorption at a recording layer is sufficiently small. Accordingly, Formula 12 is also modified for simplicity by using this relationship and employing Formula 2, thereby establishing formula as follows:

$$\frac{R_0^{1st}}{R_0} = \left(\frac{R_2}{R_0}\right)\left(\frac{R_1}{T_2^2 t_2}\right)^2 \quad \text{[Formula 13]}$$

$$= \left(\frac{R_2}{R_0}\right)\left\{\frac{R_1}{T_2^2(1-r_2)}\right\}^2$$

$$= \left(\frac{R_2}{R_0}\right)\left(\frac{R_1}{T_2^2 - R_2}\right)^2$$

Formula 3 is satisfied in the conventional multilayer disk. Accordingly, Formula 13 is also expressed as follows:

$$\frac{R_0^{1st}}{R_0} = \left(\frac{R_{ref}}{T_2^2 - R_{ref}}\right)^2, \, T_2 = t_{su} t_{sp}^6 \prod_{j=3}^{7}\left(1 - \frac{R_{ref}}{T_j^2}\right) \quad \text{[Formula 14]}$$

In contrast, relationship $R_0 < R_1 < \ldots R_{N-1} = R_{ref}$ is established in the optical disk of the present invention. The following relationships are also provided for simplicity:

$R_7 = R_{ref}$ $R_6 = \alpha R_7$ $R_5 = \alpha R_6 = \alpha^2 R_{ref}$ $R_4 = \alpha R_5 = \alpha^3 R_{ref}$ $R_3 = \alpha R_4 = \alpha^4 R_{ref}$ $R_2 = \alpha R_3 = \alpha^5 R_{ref}$ $R_1 = \alpha R_2 = \alpha^6 R_{ref}$ $R_0 = \alpha R_1 = \alpha^7 R_{ref} (\alpha < 1)$ [Formula 15]

Substituting Formula 15 into Formula 13 results in the following:

$$\frac{R_0^{1st}}{R_0} = \alpha^{10}\left(\frac{R_{ref}}{T_2^2 - \alpha^5 R_{ref}}\right)^2, \, T_2' = t_{su} t_{sp}^6 \prod_{j=3}^{7}\left(1 - \frac{R_j}{T_j^2}\right) \quad \text{[Formula 16]}$$

Relationship $T_2' > T_2$ is established between the amounts of light $T_2$ and $T_2'$ reaching the recording the recording layer L2 that are determined by Formulas 14 and 16 respectively, meaning that more light reaches a recording layer located farther from the surface of incidence in the optical disk of the present invention. This produces a side benefit as $r_i$ can be made smaller than that of the conventional optical disk in order to obtain $R_i$ of the same value. As a result, an effect produced by reducing $R_i$ increases exponentially as a recording layer is located farther from the surface of incidence.

A ratio between Formulas 14 and 16 is determined as follows in order to compare the respective degrees of effects of multiple reflection CT in the conventional optical disk and the optical disk of the present invention:

$$\frac{\text{Formula 16(optical disk of invention)}}{\text{Formula 14(conventional optical disk)}} = \quad \text{[Formula 17]}$$

$$\alpha^{10}\left(\frac{T_2^2 - R_{ref}}{T_2'^2 - \alpha^5 R_{ref}}\right)^2$$

Accordingly, on condition that a result of Formula 17 is smaller than one, the effect of multiple reflection CT is reduced by establishing relationship $R_0 < R_1 < \ldots R_{N-1}$. As $\alpha^{10} < 1$ is obviously known relationship, a result of Formula 17 is smaller than one as long as the following formula is established:

$$\left(\frac{T_2^2 - R_{ref}}{T_2'^2 - \alpha^5 R_{ref}}\right) < 1 \quad \text{[Formula 18]}$$

As already described, $T_2'$ is greater than $T_2$, and $\alpha^{10}$ is smaller than one. Accordingly, it is obviously known that the denominator is greater than the numerator of Formula 17. As a result, it is obviously seen that the optical disk of the present invention reduces the effect of multiple reflection CT.

For simplicity of the description, each relationship given in Formula 15 is employed to show that the amount of light reflected back from a recording layer is smaller as the recording layer is located farther from the surface of incidence. However, not all the relationships in Formula 15 are required to be satisfied. As an example, if the amount of reflected light Ri linearly decreases in the order from a recording layer nearest the surface of incidence of an optical disk to a recording layer located farthest from the surface of incidence as shown in FIG. 11, the ratio $R_i^{1st}/R_i$ indicating a degree of effect of multiple reflection CT can be made smaller than that of the conventional technique as shown in FIG. 12.

As described above, use of the multilayer optical disk of the present invention suppresses effect of multiple reflection generated on a recording layer located far from a surface of incidence, and suppresses effect of surface reflection that causes adverse effect during playback of a recording layer near the surface of incidence. Use of the multilayer optical disk of the present invention also reduces multiple reflection CT without positively changing adjacent interlayer distances. This increases yield in manufacture of disks, while making any specific control logic unnecessary in a drive device.

FIG. 13 shows respective values of jitter generated during playback of the conventional 20-layer optical disk designed by the conventional technique such that the amounts of light reflected back from recording layers are uniformly 1.2% with respect to the amount of incident light, and of the 20-layer optical disk of the present invention. The 20-layer optical disk of the present invention mainly reduces multiple reflection CT generated during playback of a recording layer located farther from the surface of incidence. Accordingly, a jitter value is improved on the recording layer located farther from the surface of incidence.

FIG. 14 shows an exemplary reduction rate of a jitter value of the recording layer located farthest from the surface of incidence of an optical disk (calculated by dividing the jitter value of the farthest recording layer of the optical disk of the present invention by the jitter value of the farthest recording layer of the conventional optical disk). It is seen from FIG. 14 that a jitter value decreases to a greater extent with the number of recording layers increasing. The characteristics of an attenuation rate shown in FIG. 14 are obtained under the following conditions. For the conventional optical disk, distances between recording layers are uniformly 10 μm, and the amounts of light reflected back from all the recording layers are uniform. For the optical disk of the present invention, distances between recording layers are uniformly 10 μm, the amount of light reflected back from the farthest recording layer is half the amount of light reflected back from the nearest recording layer, and the amount of reflected light is linearly attenuated toward the farthest recording layer.

Assuming that the refractive index of a cover layer or an intermediate layer of an optical disk is 1.5, the disk surface has a reflectance of about 4%. Meanwhile, a recording layer nearest the surface of incidence of a 20-layer optical disk is spaced about 15 μm from the surface. In light of the characteristics of the relationship shown in FIG. 10 between a focus position and surface reflecting light entering a detector, it is seen that the surface reflecting light entering the detector during playback of the recording layer L19 nearest the surface of incidence is about 0.1%. In order for So/No mentioned above to be at least 20 dB or more, the amount of light $R_{19}$ reflected back from the recording layer L19 should be at least ten times or more the surface reflection light, namely 1% or more.

It is assumed that the amount of light $R_{19}$ reflected back from the recording layer L19 is from 1.0 to 1.6%, and that the amount of reflected light linearly decreases in the order from the recording layer L19 toward recording layers located farther from the recording layer L19. In this case, in order to reduce multiple reflection CT to a sufficient level on the farthest recording layer L0, the amount of light $R_0$ reflected back from the farthest recording layer L0 should be reduced. FIG. 15 shows to which degree the amount of light $R_0$ reflected back from the farthest recording layer L0 should be reduced.

It is seen from FIG. 15 that increasing the amount of reflected light $R_{19}$ requires more reduction of the amount of reflected light $R_0$ in order to achieve the same effect. Reducing the amount of reflected light $R_0$ increases the amount of incident light required to maintain Se/Ne at the same level. Increasing the amount of incident light results not only in greater power consumption but also in the need of enhancing light resistance of a disk (as the disk deteriorates as a result of repeated application of a laser beam). Accordingly, it is desired that the amount of reflected light $R_0$ be not reduced excessively.

In light of the foregoing, the above-mentioned 20-layer optical disk of Example is designed such that the reflectance of the recording layer L19 is 1.2%, the reflectance of the farthest recording layer L0 is 0.6% (namely, the reflectance making the amount of light reflected back therefrom half the amount of light reflected back from the recording layer L19), and a reflectance linearly decreases for the recording layers therebetween.

It is also seen from FIG. 15 that the jitter value of the farthest recording layer L0 can be 10% or less only on the condition that the value of $R_{19}/R_0$ is 0.8 or lower. It cannot be concluded that jitter of 10% is an appropriate condition of system establishment as the performance of a recording/playback drive should be considered. However, it is seen that relationship $R_{19}/R_0 \leq 0.8$ should be satisfied in order to achieve an effect from the viewpoint of a jitter value as an index.

Linearly reducing a reflectance results in an advantage in that each recording layer becomes free from excessive increase of multiple reflection CT from its adjacent layer. Meanwhile, it is desirable that the respective amounts of light reflected back from the recording layers L19 and L0 be made large and small. Thus, a distribution with sudden change such as that shown in FIG. 16 is conceivable, for example. In the distribution of FIG. 16, the amounts of light reflected back from the recording layers L19 to L9 are uniformly 1.2%, and those reflected back from the recording layers L8 to L0 are uniformly 0.6% This distribution of the amount of reflected light may in fact reduce the effect of multiple reflection CT. However, this distribution in turn relatively increases interlayer crosstalk light (once reflected light) from the recording layer L9 that is generally generated during playback of the recording layer L8 or L7. Accordingly, the aforementioned distribution of the amount of reflected light with sudden change is not desirable.

The intermediate layers between the recording layers have the same thickness in the optical disk of Example described above. As shown in FIG. 17, the intermediate layers may have two types of thicknesses (LA and LB), and may be arranged in a structure with alternating layers in which the intermediate layers of the different thicknesses are alternately arranged.

A multilayer optical disk of a structure with alternating layers reduces the number of confocal spots by half generated as a result of multiple reflection, so that the effect of multiple reflection CT is smaller than that of a disk of a structure with uniform layers. However, as a confocal spot is generated once every two layers, even the structure with alternating layers may still suffer from the effect of multiple reflection CT depending on the reflectance of each layer. In this case, by introducing the design concept of the present application, the reflectance of each layer is designed such that the amount of reflected light decreases in the order from the nearer side to the farther side. This effectively reduces the effect of multiple reflection CT.

If the alternating layers are employed to reduce the effect of multiple reflection CT, a difference between the smaller and greater interlayer distances LA and LB is preferably equal to or greater than 4 μm in light of an error in manufacture of disks, the depth of focus of a playback beam spot, and the like.

The optical disk shown in FIG. 17 was described to have a structure with alternating layers in which interlayer distances are smaller and greater than an interlayer distance of a structure with uniform layers in order to maintain a distance between the nearest and farthest layers at the same level. However, reducing an interlayer distance increases generally occurring interlayer CT (once reflected CT). Accordingly, an actual situation is that the smaller interlayer should be the same as that of the structure of uniform layers, and that the other interlayer should be increased. However, an increased distance between the nearest and farthest layers necessitates extension of the dynamic range of a spherical aberration correcting optical system. Accordingly, restrictions are also imposed to keep increase of this distance at the minimum possible level.

In light of the foregoing, an appropriate difference between two types of interlayer distances is about 4 to 6 μm if a structure with alternating layers is employed.

The optical disk as an optical recording medium described above in Example has eight or 20 stacked recording layers. The present invention is also applicable to an optical disk with three or more stacked recording layers. While the optical disk described above is a playback-only optical disk with recording layers on which pits are transferred. The present invention is also applicable to a write-once or rewritable optical disk.

The shape of an optical recording medium is not necessarily a disk. An optical memory with three or more stacked recording layers is also applicable.

[EXPLANATION OF REFERENCE SIGNS]

Figure 1:
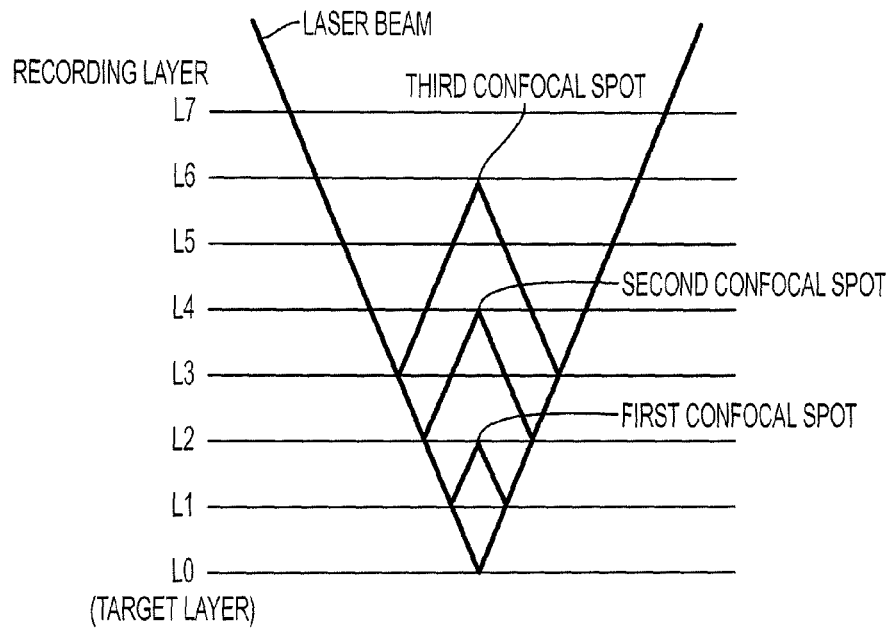
FIG. 1 is a diagram showing a path of light reflection when a laser beam is focused on the farthest recording layer of a multilayer optical disk.
Figure 2:
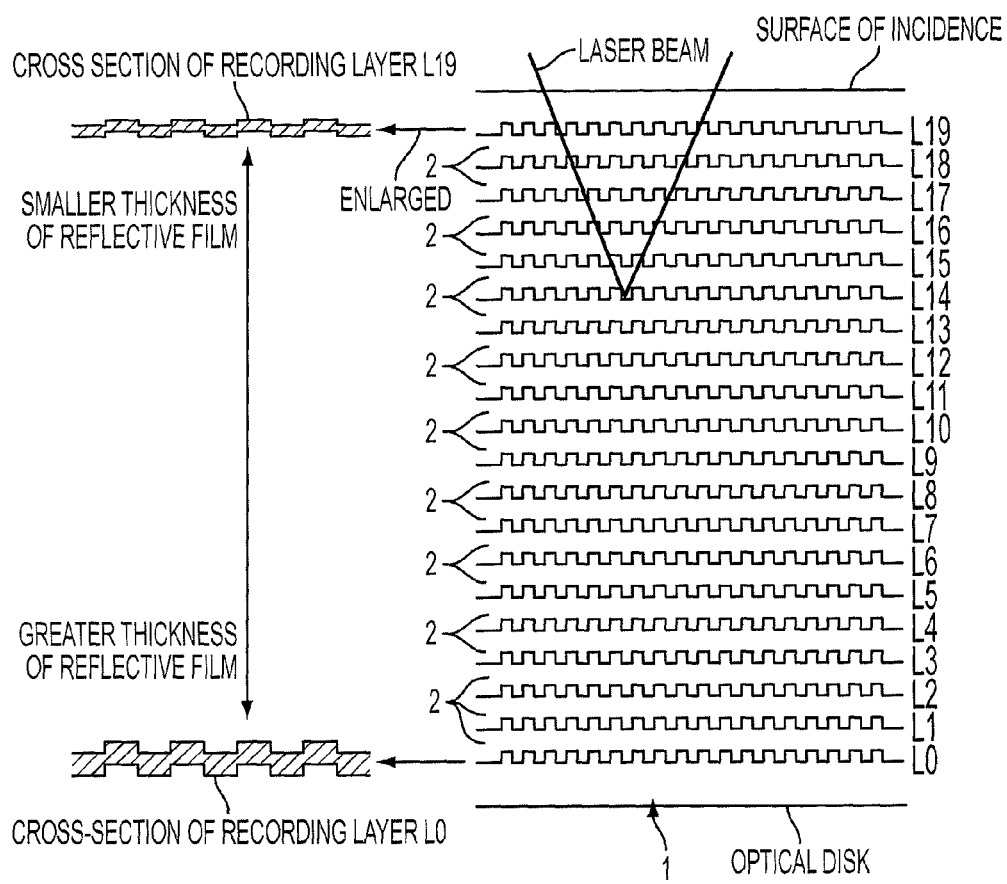
FIG. 2 is a cross sectional view of Example of the present invention.
Figure 3:
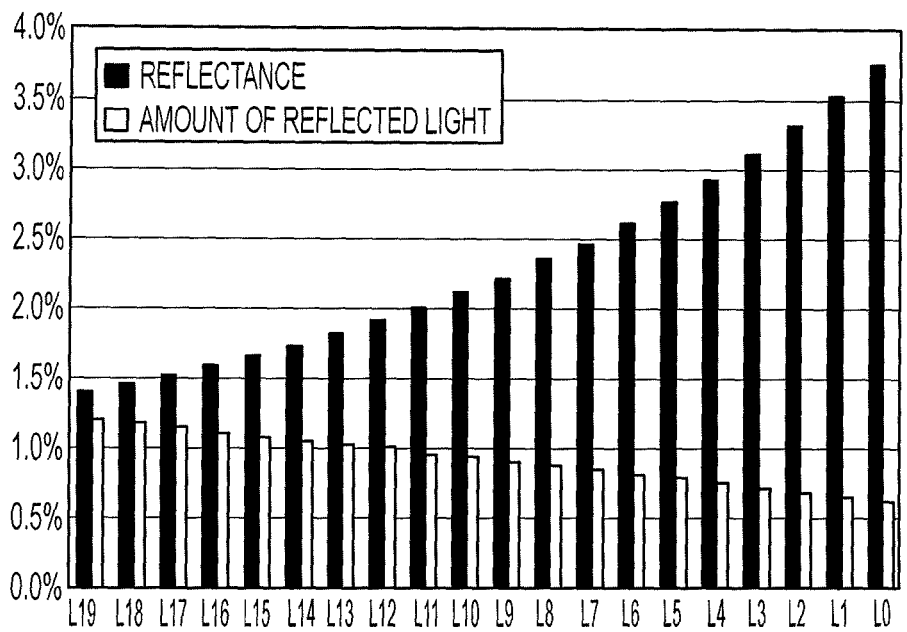
FIG. 3 is a diagram showing the reflectance of each recording layer and the amount of light reflected back from each recording layer of the optical disk of FIG. 2.
Figure 4:
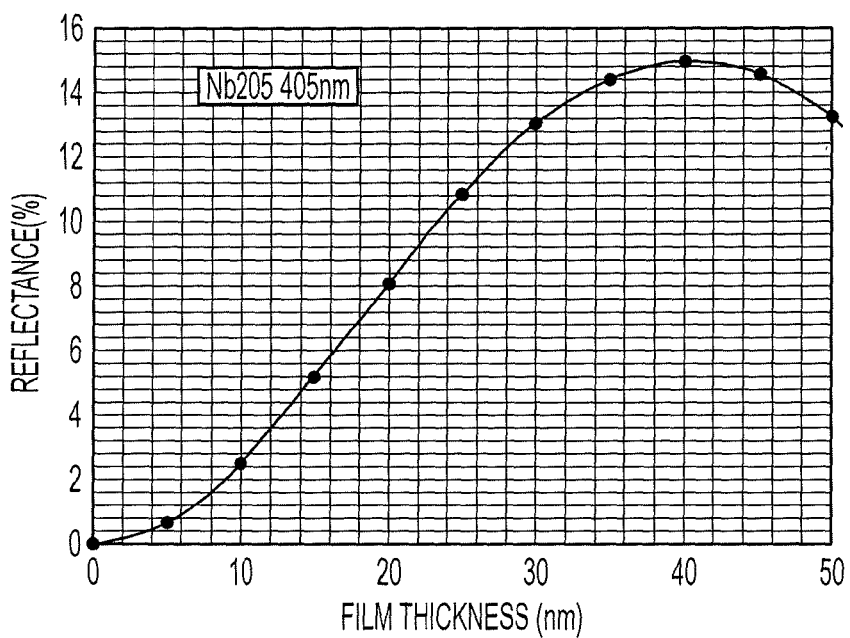
FIG. 4 is a diagram showing the relationship between the thickness of a dielectric reflective film and a reflectance.
Figure 5A:
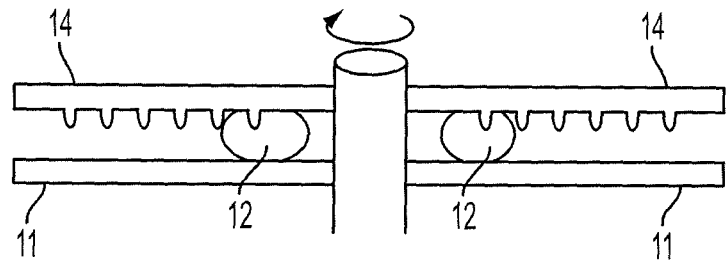
FIG. 5 is a diagram showing a method of manufacturing the optical disk of FIG. 2.
Figure 5B:
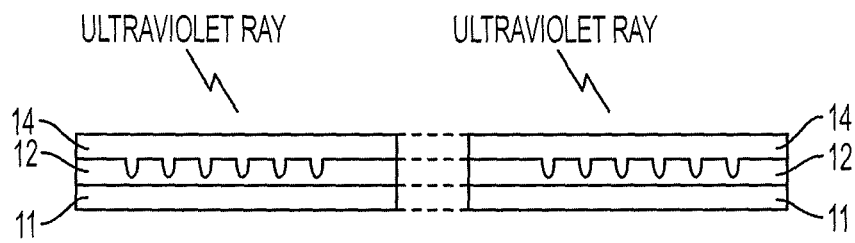
Figure 5C:
Figure 6:
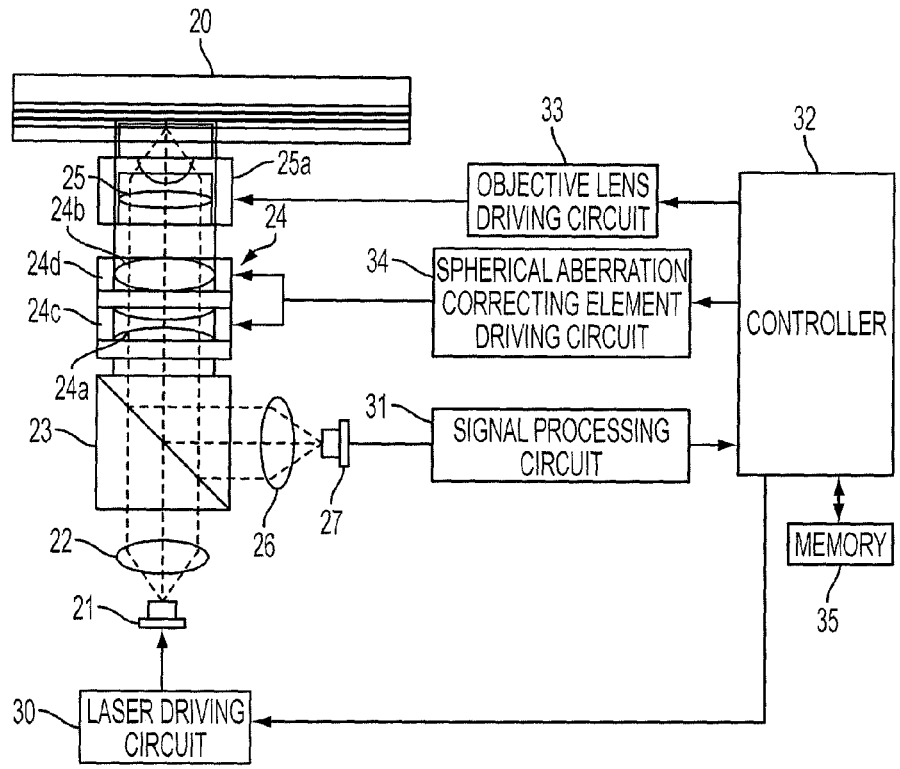
FIG. 6 is a diagram showing the structure of a disk drive device for actuating the optical disk of FIG. 2.
Figure 7:
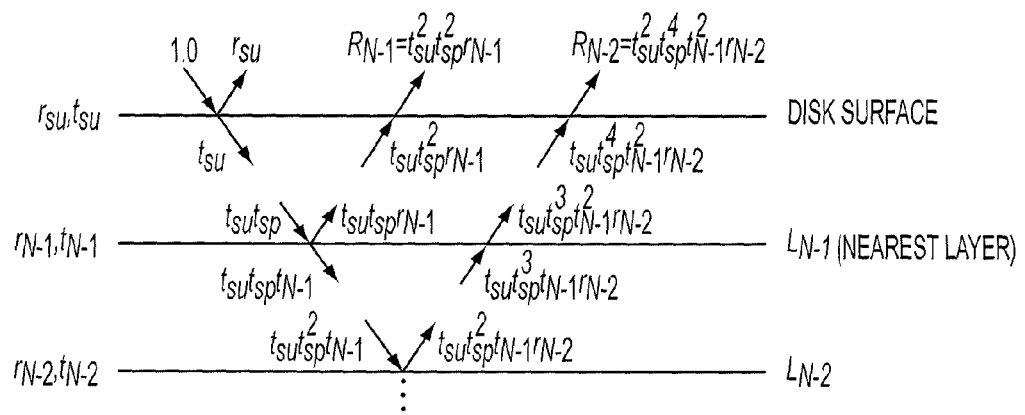
FIG. 7 is a diagram illustrating the amount of light reflected back after entering a multilayer optical disk and after being reflected of each recording layer.
Figure 8:
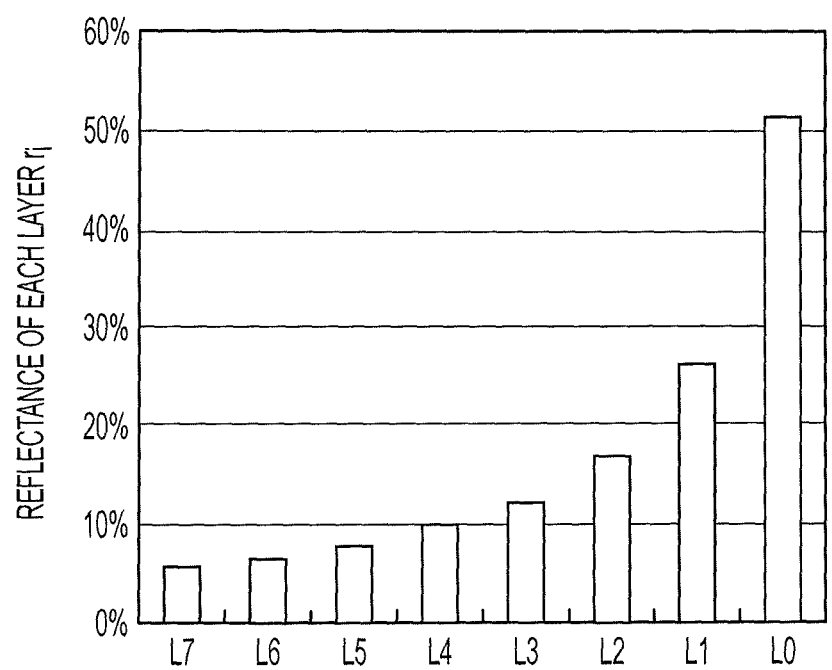
FIG. 8 is a diagram showing the reflectance of each recording layer.
Figure 9A:
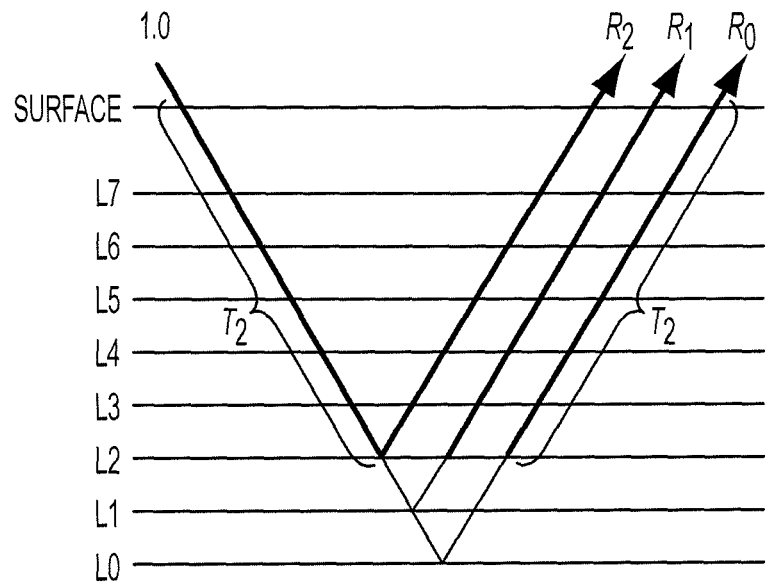
FIG. 9 is a diagram showing a path of a light beam reflected back from each recording layer during playback.
Figure 9B:
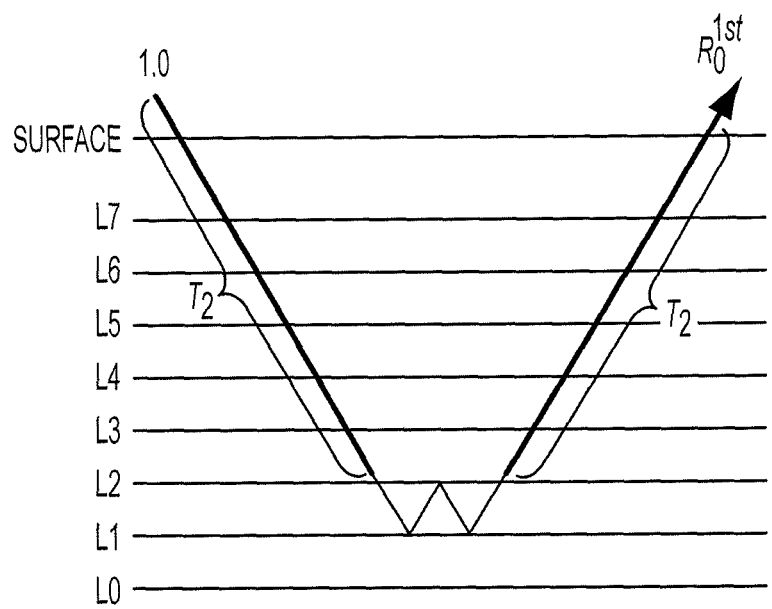
Figure 10:
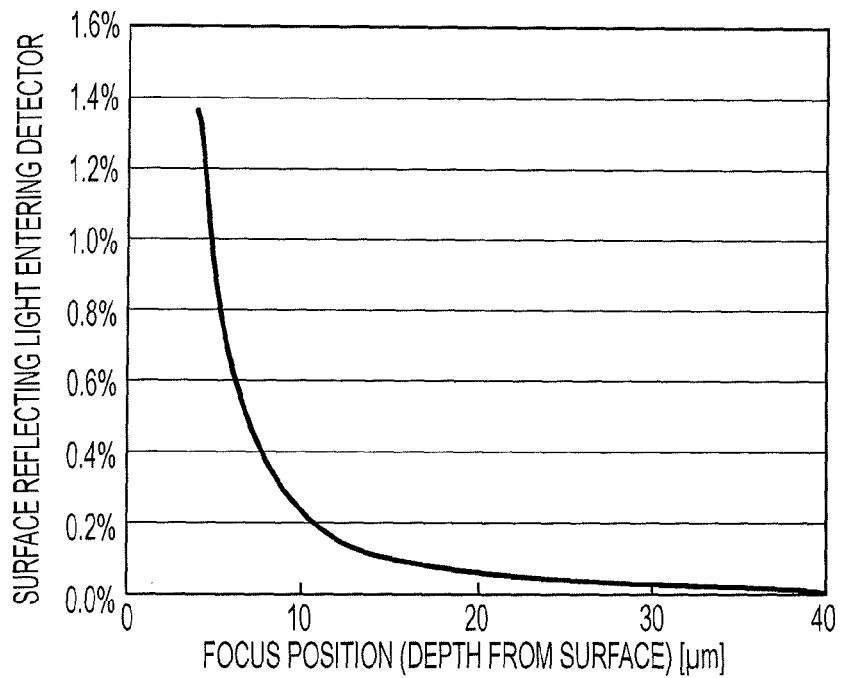
FIG. 10 is a diagram showing the amount of surface reflecting light entering a detector with respect to a focus position.
Figure 11:
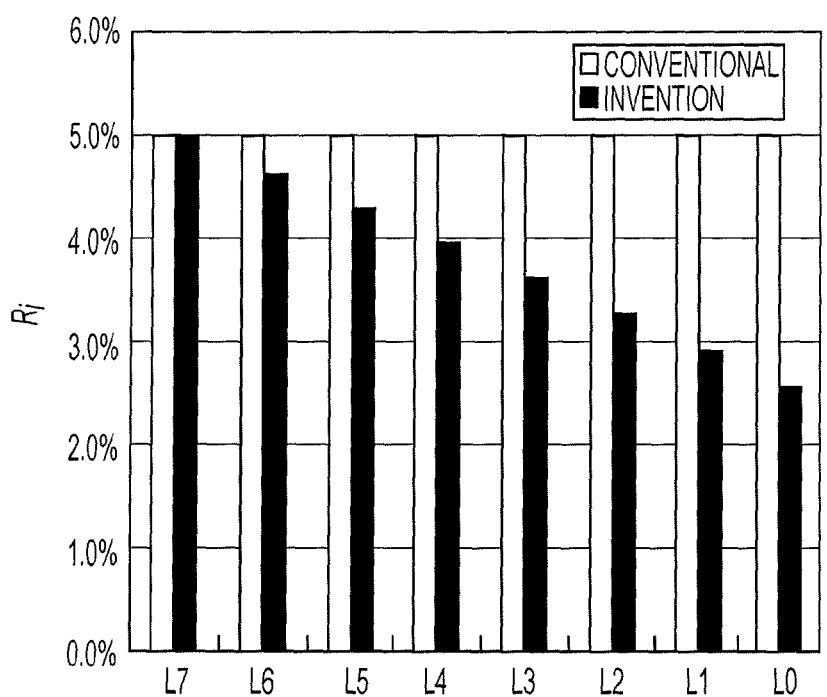
FIG. 11 is a diagram showing a difference in the amount of reflected light between a conventional optical disk and the optical disk of the present invention.
Figure 12:
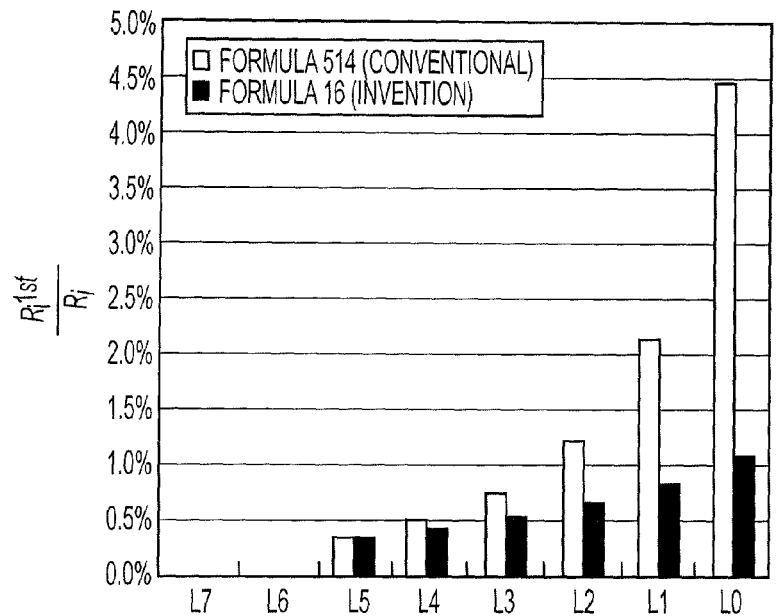
FIG. 12 is a diagram showing a difference in a degree of effect of multiple reflection CT between the conventional optical disk and the optical disk of the present invention.
Figure 13:
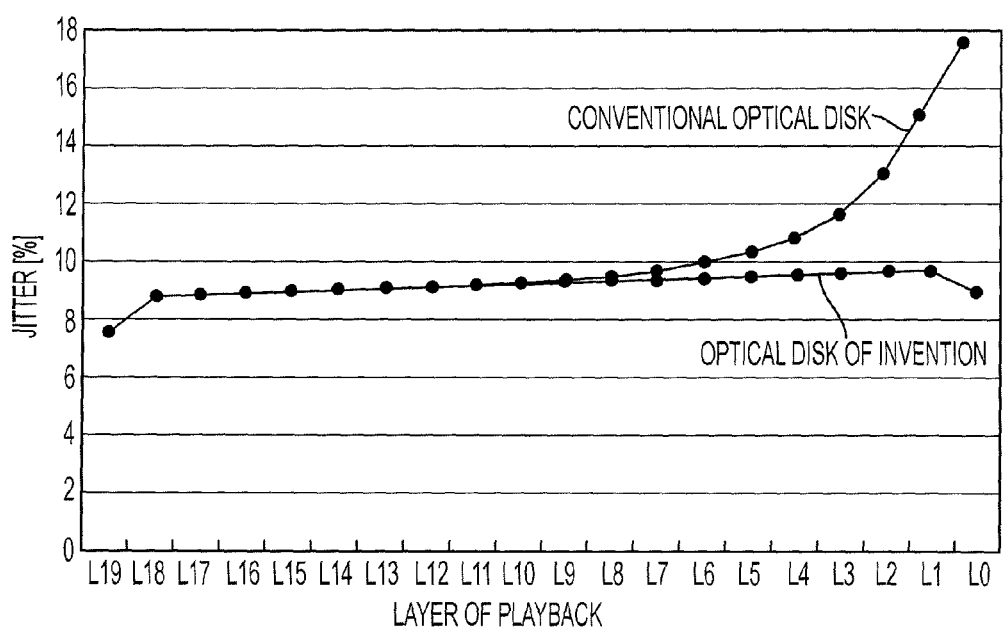
FIG. 13 is a diagram showing reduction of a jitter value in the disk of FIG. 2.
Figure 14:
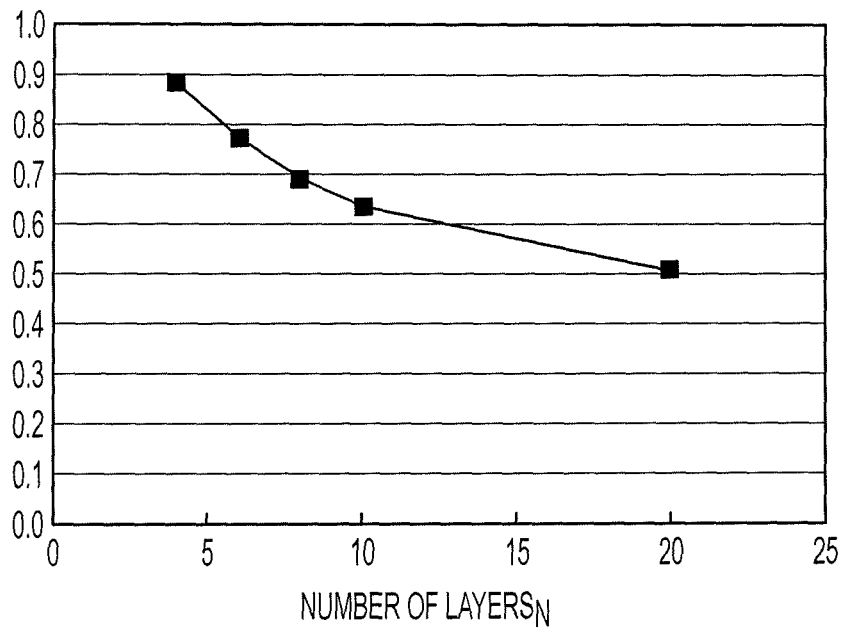
FIG. 14 is a diagram showing the attenuation rate of the jitter value of the farthest recording layer.
Figure 15:
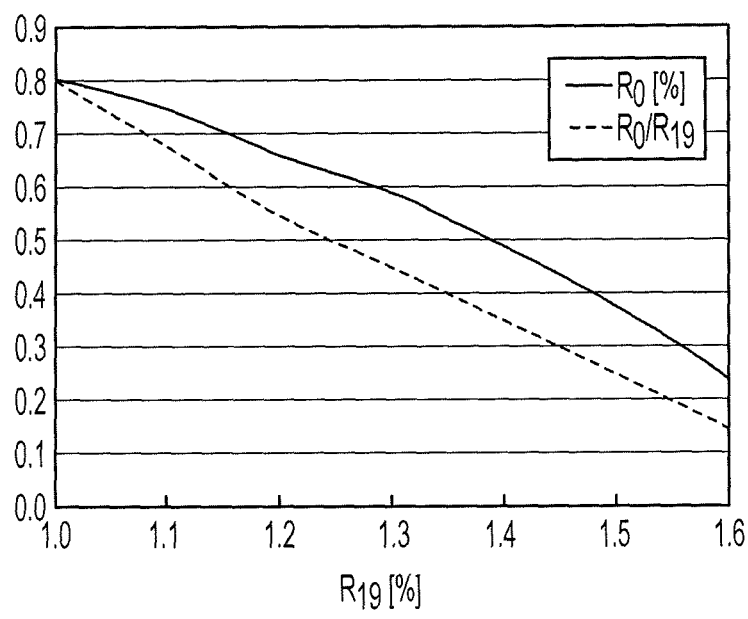
FIG. 15 is a diagram showing a condition to make the jitter value of the farthest recording layer to be 10% or less.
Figure 16:
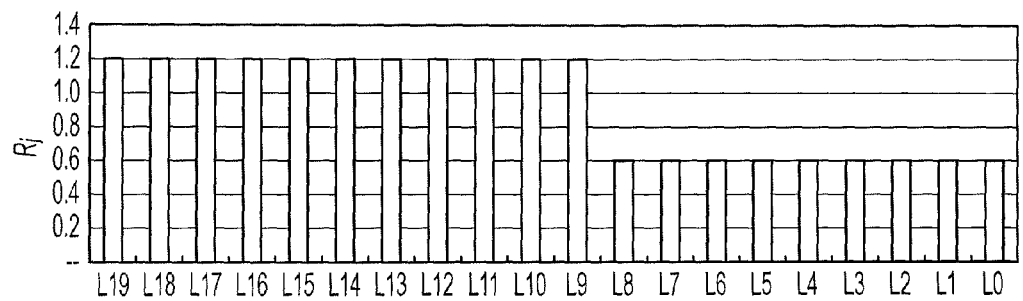
FIG. 16 is a diagram showing a distribution of the amount of reflected light controlled to have two values.
Figure 17:
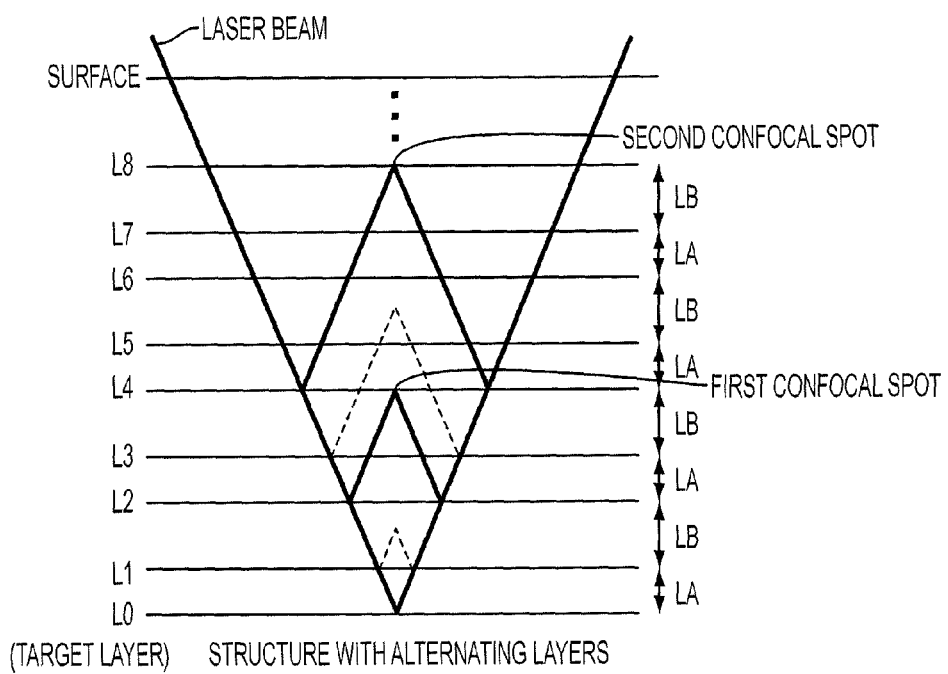
FIG. 17 is a diagram showing a multilayer optical disk of a structure with alternating layers.

| | |
|---|---|
| L0 to L19 | Recording layer |
| 20 | Optical disk |
| 21 | Light source |
| 23 | Beam splitter |
| 24 | Expander lens |
| 25 | Objective lens |
| 27 | Detector |
| 31 | Signal processing circuit |
| 32 | Controller |
| 33 | Objective lens driving circuit |
| 34 | Spherical aberration correcting element driving circuit |

The invention claimed is:

1. A multilayer optical recording medium with at least three stacked recording layers, wherein, as a recording layer is located farther from a surface of incidence of a light beam for reading, an amount of light that reaches the surface of incidence after being reflected off the recording layer is smaller; and wherein the amount of light reflected back from the recording layer located farthest from the surface of incidence is 0.5 times or more the amount of light reflected back from the recording layer located nearest the surface of incidence.

2. The optical recording medium according to claim 1, wherein an amount of light reflected back from a recording layer located farthest from the surface of incidence is 0.8 times or less an amount of light reflected back from a recording layer located nearest the surface of incidence.

3. The optical recording medium according to claim 1, wherein the amount of reflected light linearly decreases in the order from the recording layer located nearest the surface of incidence to the recording layer located farthest from the surface of incidence.

4. A multilayer optical recording medium with at least three stacked recording layers, wherein, as a recording layer is located farther from a surface of incidence of a light beam for reading, an amount of light that reaches the surface of incidence after being reflected off the recording layer is smaller, wherein different interlayer distances are alternately employed between adjacent recording layers.

5. The optical recording medium according to claim 4, wherein a distance between the different interlayer distances is four to six microns.

6. A multilayer optical recording medium with at least three stacked recording layers, wherein, as a recording layer is located farther from a surface of incidence of a light beam for reading, an amount of light that reaches the surface of incidence after being reflected off the recording layer is smaller, wherein an amount of light reflected back from a recording layer located farthest from the surface of incidence is 0.8 times or less an amount of light reflected back from a recording layer located nearest the surface of incidence, and wherein different interlayer distances are alternately employed between adjacent recording layers.

7. The optical recording medium according to claim 6, wherein a distance between the different interlayer distances is four to six microns.

8. A multilayer optical recording medium with at least three stacked recording layers, wherein, as a recording layer is located farther from a surface of incidence of a light beam for reading, an amount of light that reaches the surface of incidence after being reflected off the recording layer is smaller, wherein the amount of reflected light linearly decreases in the order from the recording layer located nearest the surface of incidence to the recording layer located farthest from the surface of incidence, and wherein different interlayer distances are alternately employed between adjacent recording layers.

9. The optical recording medium according to claim 8, wherein a distance between the different interlayer distances is four to six microns.

* * * * *